(12) United States Patent
Chia-Li et al.

(10) Patent No.: US 7,901,118 B2
(45) Date of Patent: Mar. 8, 2011

(54) LUMINOUS PEDAL FOR A BICYCLE

(75) Inventors: Chen Chia-Li, Zhong-He (TW); Tseng Jui-Huang, Zhong-He (TW)

(73) Assignee: DOSUN Solar Technology Co., Ltd., Taipei County (TW)

( * ) Notice: Subject to any disclaimer, the term of this patent is extended or adjusted under 35 U.S.C. 154(b) by 0 days.

(21) Appl. No.: 11/984,999

(22) Filed: Nov. 26, 2007

(65) Prior Publication Data
US 2010/0214792 A1    Aug. 26, 2010

(30) Foreign Application Priority Data

Mar. 13, 2007   (TW) .............................. 96204052 U (51) Int. Cl.
*B62J 6/10*   (2006.01)
*F21L 13/06*   (2006.01)

(52) U.S. Cl. ........................................ 362/473; 362/192
(58) Field of Classification Search .................. 362/192, 362/473, 523, 524
See application file for complete search history.

(56) References Cited

U.S. PATENT DOCUMENTS

| | | | | |
|---|---|---|---|---|
| 2,424,700 A * | 7/1947 | McMath | ........................ | 362/192 |
| 4,613,010 A * | 9/1986 | Enocson | ........................ | 280/260 |
| 5,165,776 A * | 11/1992 | Long-Jen | ..................... | 362/473 |
| 5,662,405 A * | 9/1997 | Kuo | .............................. | 362/473 |
| 6,104,096 A * | 8/2000 | Hicks | ............................ | 290/1 R |
| 6,454,445 B1 * | 9/2002 | Liaw et al. | .................... | 362/473 |
| 6,550,945 B2 * | 4/2003 | Chiu | ............................. | 362/473 |
| 6,789,926 B2 * | 9/2004 | Chang | .......................... | 362/473 |
| 6,959,999 B2 * | 11/2005 | Lee | ................................ | 362/192 |
| 7,402,915 B2 * | 7/2008 | Hutchinson et al. | .......... | 290/1 A |
| 7,628,518 B2 * | 12/2009 | Fujii et al. | ..................... | 362/476 |

FOREIGN PATENT DOCUMENTS

TW            530806       *   5/2003

* cited by examiner

*Primary Examiner* — John-Suk (James) Lee
*Assistant Examiner* — Stanley Weinberg
(74) *Attorney, Agent, or Firm* — Muncy, Geissler, Olds & Lowe, PLLC (57) ABSTRACT

A luminous pedal for a bicycle comprises a pedal, a luminous unit, and a rotary unit. The pedal has slots at two lateral sides respectively and a supporting portion in the middle. One end of the pedal is provided with an axial hole communicating with the supporting portion. The luminous unit has luminous portions and a coil seat. The luminous portions are disposed in the slots and the coil seat is detachably connected with a permanent magnet having a dentate part. The rotary unit includes an axial rod, a first gear, and a second gear. The first gear is disposed at the axial rod that is inserted into the axial hole. The second gear has a first disc and a second disc that are superimposed coaxially and the first disc is smaller than the second disc and the first gear. The two discs are engaged with the first gear and the permanent magnet. Thereby, the permanent magnet can be rotated rapidly by means of the differential ratio of the first and the second gears to produce enough electric power. Consequently, the luminous unit can be lightened stably.

14 Claims, 7 Drawing Sheets

Fig. 8

LUMINOUS PEDAL FOR A BICYCLE

BACKGROUND OF THE INVENTION

1. Field of the Invention

The present invention relates to a luminous pedal for a bicycle and, more particularly, to a luminous pedal for a bicycle that works by means of the differential ratio of a first and a second gears to produce enough electric power for stable illumination.

2. Description of the Prior Art

A luminous pedal for a bicycle is published on Taiwan patent Gazette with publication No. 530806. The luminous pedal for a bicycle comprises a pedal body, a spindle, and reflection plates. The pedal body includes a frame having an anterior part at one end and a posterior part at another opposite end. The two sides of the anterior part and the posterior part extend and connect with each other to form lateral parts respectively. A central seat is formed between the anterior part and the inner surfaces of the lateral parts. A space is formed within the anterior part and opens to outside. A track is formed on the outer surface of each lateral part. A cover is provided for covering the opening of the space and is locked. The cover with a hole aligns with the central seat. Each lateral part includes a lateral plate extending between the flanges of the anterior and the posterior parts. The lateral plates are provided with recessed notches for passing wires at its top end and bottom end near the space respectively. A ⊏-shape frame is provided for surrounding the three sides of each lateral plate and a track is formed between the lateral plate and the flanges of the frame. Two free ends of the cover are disposed against the ends of the frame. The bottom of the space of the pedal body has small notches at two ends thereof near the opening. The ⊓-shape cover has corresponding protrusions that are disposed on one surface facing the pedal body for engagement with the notches respectively.

The pivotal spindle is disposed within the central seat and one end thereof protrudes by the hole of the cover. The part of spindle that corresponds to the position of the space is surrounded by a circular permanent magnet that is disposed with a coil seat at the external surface thereof and the coil seat is adhered to the inner surface of the space. The coil seat is spaced from the permanent magnet in a preset distance.

The reflection plates are inserted respectively into the tracks of the lateral parts of the pedal body. The reflection plate is fixedly provided with a plurality of luminous elements. Each luminous element is in electric connection with the coil seat, so that the electric power produced by the coil seat can be transferred to each luminous element for lightening the luminous element.

According to the description of the luminous pedal for a bicycle mentioned above, electric power can be produced only by the coactions of the coil seat and the permanent magnet as a result of the rotation of the spindle and the produced electric power is provided to each luminous element for illumination. However, the coil seat cannot store the produced electric power. Thus, the luminous elements can be lightened continuously only when the pedal body is turned continuously to produce electric power via the cooperation of the coil seat and the permanent magnet. Bicycle riders may stop stepping on the bicycle pedals because they have to slow down the speed of their bicycles or even stop the bicycles when they are in front of a red light or get into a traffic jam. Or they don't have to step on the pedals when they are riding on the downhill section of a road. Under these conditions, sufficient electric power cannot be produced continuously because bicycle riders stop stepping on the pedals and accordingly the permanent magnet fails to work with the coil seat. Consequently the luminous elements will be lightened intermittently or even stop lightening. If the pedals stop rotating, the luminous elements will also stop lightening and fails to perform warning function.

SUMMARY OF THE INVENTION

The main object of the present invention is to provide a luminous pedal for a bicycle by means of the differential ratio of a first gear and a second gear to produce enough electric power for stably illuminating a luminous unit.

In order to achieve the above object, the present invention provides a luminous pedal for a bicycle comprising a pedal, a luminous unit, and a rotary unit. The pedal has slots at two lateral sides respectively and a supporting portion in the middle. One end of the pedal is provided with an axial hole communicating with the supporting portion. The luminous unit has luminous portions and a coil seat. The luminous portions are disposed in the slots and the coil seat is detachably disposed with a permanent magnet having a dentate part. The rotary unit includes an axial rod, a first gear, and a second gear. The first gear is disposed at the axial rod that is movably inserted into the axial hole. The second gear has a first disc and a second disc that are superimposed coaxially and the first disc is smaller than the second disc and the first gear. The two discs are engaged with the first gear and the dentate part of the permanent magnet.

The following detailed description, given by way of examples and not intended to limit the invention solely to the embodiments described herein, will best be understood in conjunction with the accompanying drawings.

DETAILED DESCRIPTION OF THE PREFERRED EMBODIMENTS

Figure 1:
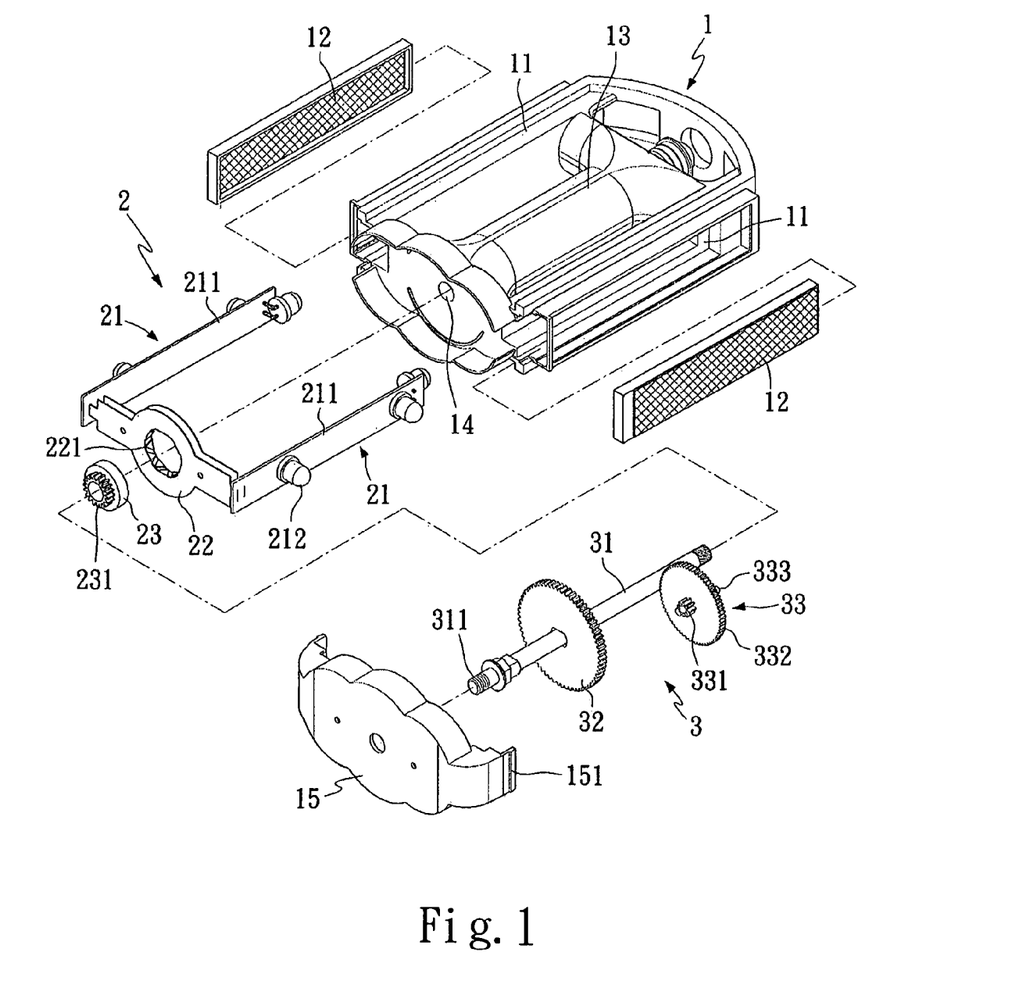
FIG. 1 is an exploded perspective view of the present invention.
Figure 2:
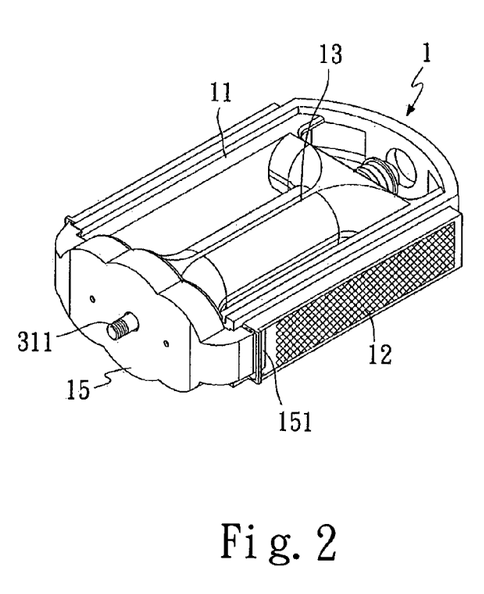
FIG. 2 is a perspective view of the present invention.
Figure 3:
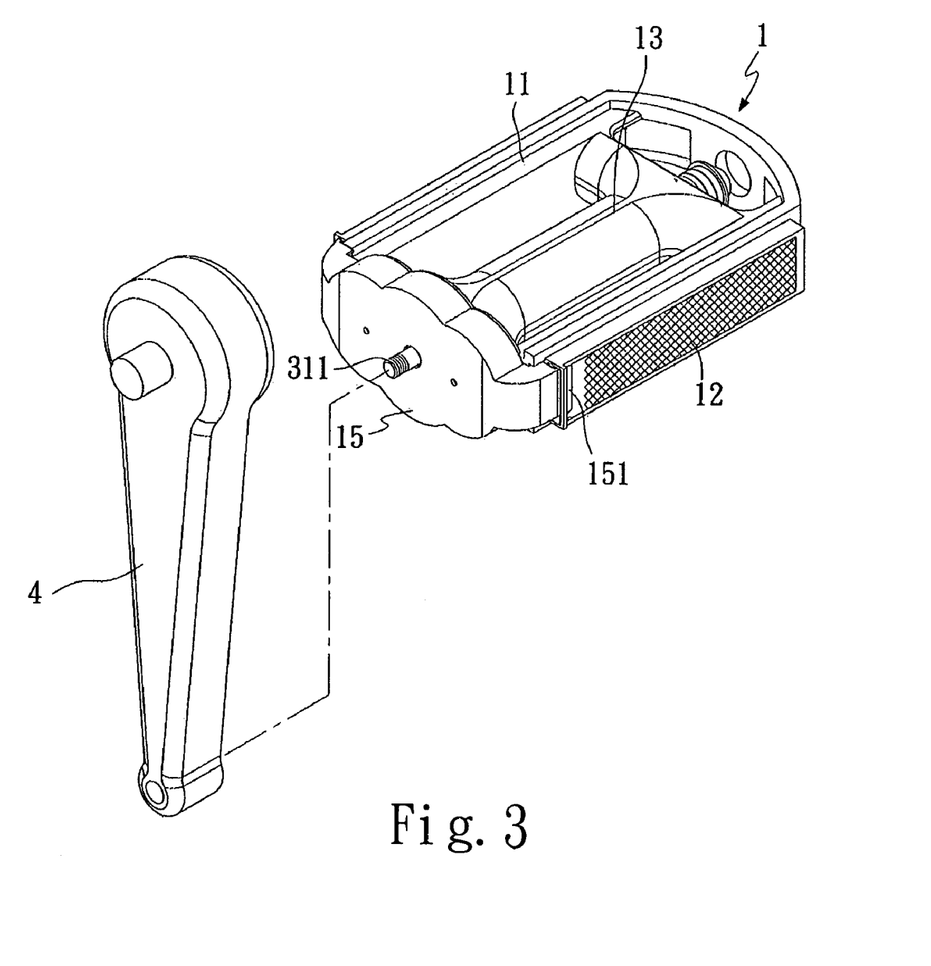
FIG. 3 shows a using-state diagram of the present invention.
Figure 4:
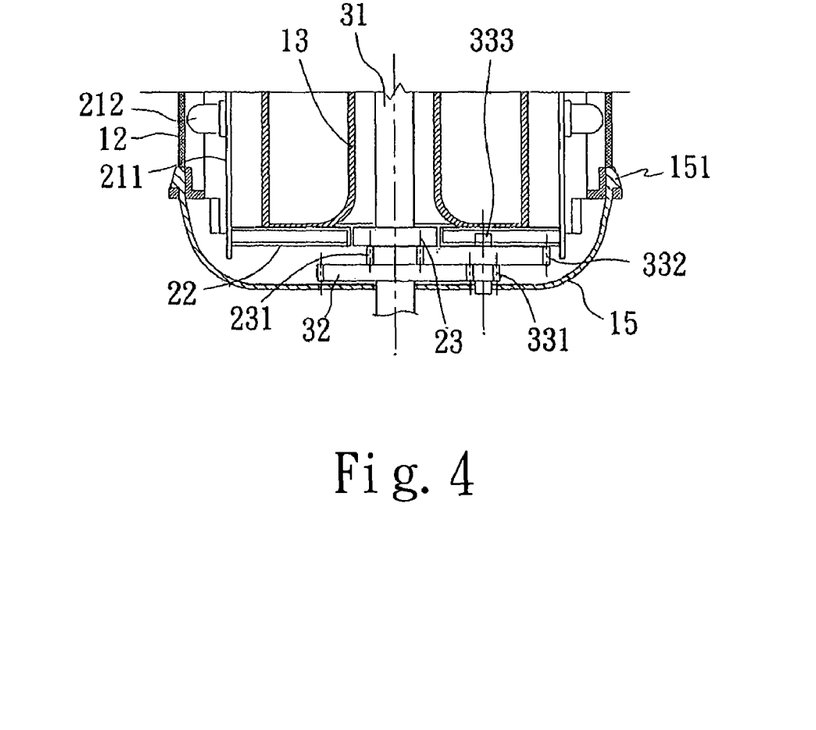
FIG. 4 is a sectional top view of the present invention.
Figure 5:
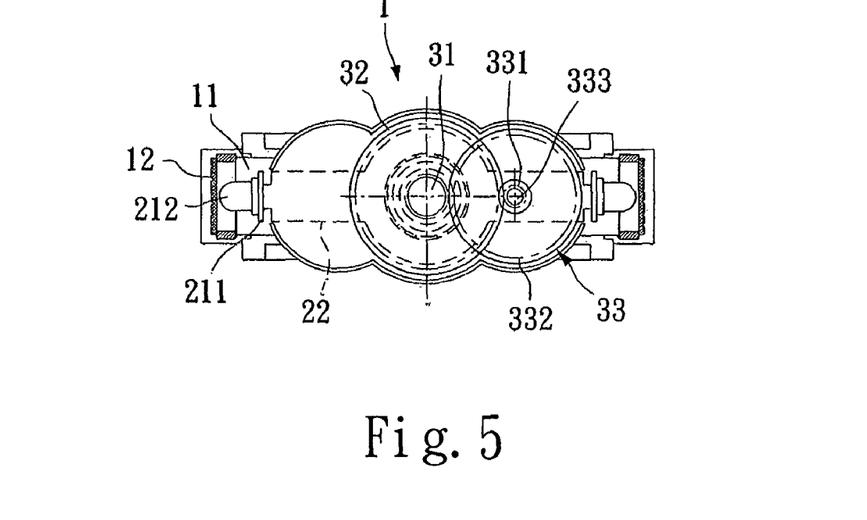
FIG. 5 is a sectional lateral view of the present invention.
Figure 6:
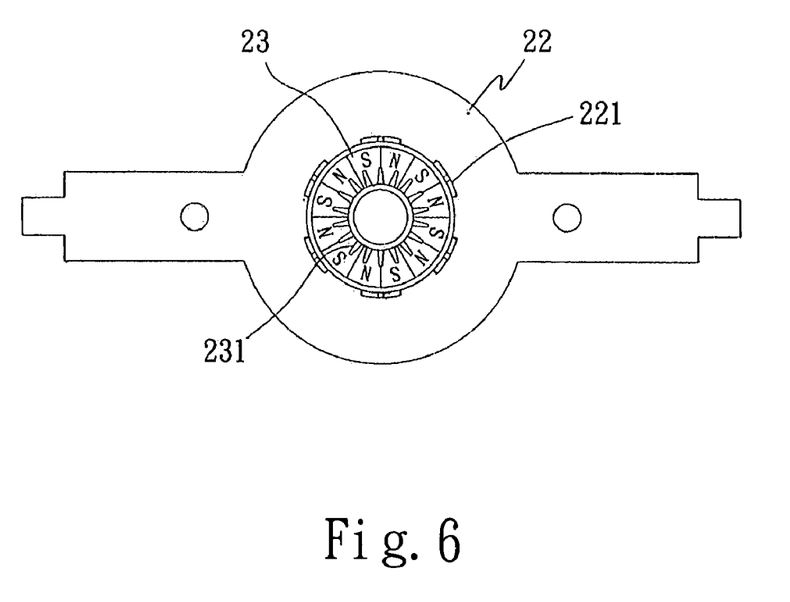
FIG. 6 is a top view showing a coil seat of the present invention.

Please refer to FIGS. 1 and 2 that show an exploded perspective view and a perspective view of the present invention respectively. As shown in FIGS. 1 and 2, the present invention discloses a luminous pedal for a bicycle comprising a pedal 1, a luminous unit 2, and a rotary unit 3. A permanent magnet disposed in the luminous unit 2 is rotated rapidly by means of the differential ratio of the rotary unit 3 to produce enough electric power for enlightening the luminous unit 2 stably.

Two lateral sides of the pedal 1 have slots 11 respectively and one side of each slot 11 is provided with a reflection plate 12. The pedal 1 has a supporting portion 13 in the middle and one end of the pedal 1 is provided with an axial hole 14 that communicates with the supporting portion 13.

The luminous unit 2 includes luminous portions 21 that are disposed in the slots 11 respectively, a coil seat 22 that is in electric connection with the luminous portions 21 and is disposed at one end of the pedal 1, and a permanent magnet 23 that is movably disposed in the coil seat 22. Each luminous portion 21 at least has a circuit board 211 and a plurality of luminous bodies 212 disposed on the circuit board 211. The coil seat 22 has coil 221 connected with the circuit board 211. The permanent magnet 23 is provided with a dentate part 231 on a surface.

The rotary unit 3 includes an axial rod 31 that is movably provided in the axial hole 14 and has a thread part 311 at one end, a first gear 32 disposed on the axial rod 31, and at least a second gear 33 having a first disc 331 and a second disc 332. The first disc 331 is coaxially provided on one surface of the second disc 332 and the other surface of the second disc 332 is provided with an axis 333 that is movably connected with the coil seat 22 of the luminous unit 2. The first disc 331 is smaller than the second disc 332 and the first gear 32. The first disc 331 and the second disc 332 are engaged with the first gear 32 and the dentate part 231 of the permanent magnet 23 respectively.

Besides, a cover 15 is provided at one end of the pedal 1 for enclosing the coil seat 22, the permanent magnet 23, the first gear 32, and the second gear 33. The thread part 311 at one end of the axial rod 31 protrudes out of the cover 15. Moreover, each end of the cover 15 is provided with a hook 151 respectively for connection with one end of each slot 11 of the pedal 1. The elements mentioned above constitute a luminous pedal for a bicycle of the present invention.

Please refer to FIGS. 3, 4, 5, and 6 and these figures show a using-state diagram, a sectional top view, a sectional lateral view, and a top view showing a coil seat of the present invention respectively. As shown in these figures, when the present invention is put into practice, the pedal 1 is connected to a turning linkage rod 4 of a bicycle via the thread part 311 disposed at one end of the axial rod 31 of the rotary unit 3. When a bicycle rider steps on the pedal 1, the axial rod 31 is turned and thus the first gear 32 is turned with the rotation of the axial rod 31. When the first gear 32 is turned, the first disc 331 and the second disc 332 of the second gear 33 are rotated accordingly. The permanent magnet 23 is rotated as a result that the dentate part 231 provided on one surface of the permanent magnet 23 is rotated with the rotation of the second disc 332 of the second gear 33. Thereby, North-pole and South-pole inductions are generated in the coil seat 22 as a result of the rotation of the permanent magnet 23. By means of the cooperation of the inductions and the coil 221 of the coil seat 22, electric power is produced according to the principle of charging by magnetic induction and is provided to the circuit board 211 of the luminous portion 21. The electric power is provided to the luminous bodies 212 for illumination after being rectified via the circuit board 211. The light from the luminous bodies 212 can be made more intense and more centralized by means of the reflection of the reflection plate 12 of the pedal 1. One rotation of the first gear 32 will cause several rotations of the first disc 331 of the second gear 33 because the first disc 331 of the second gear 33 is smaller than the second disc 332 and the first gear 32. By means of the differential ratio of the rotation of the first gear 32 and the second gear 33, the permanent magnet 23 can be rotated rapidly as a result that the dentate part 231 is turned by the second disc 332. Therefore, enough electric power can be produced by the cooperation of the fast-rotated permanent magnet 23 and the coil seat 22. The luminous bodies 212 of the luminous unit 2 can be lightened stably without the condition that the luminous bodies fail to be lightened continuously due to insufficient electric power can be prevented.

Figure 7:
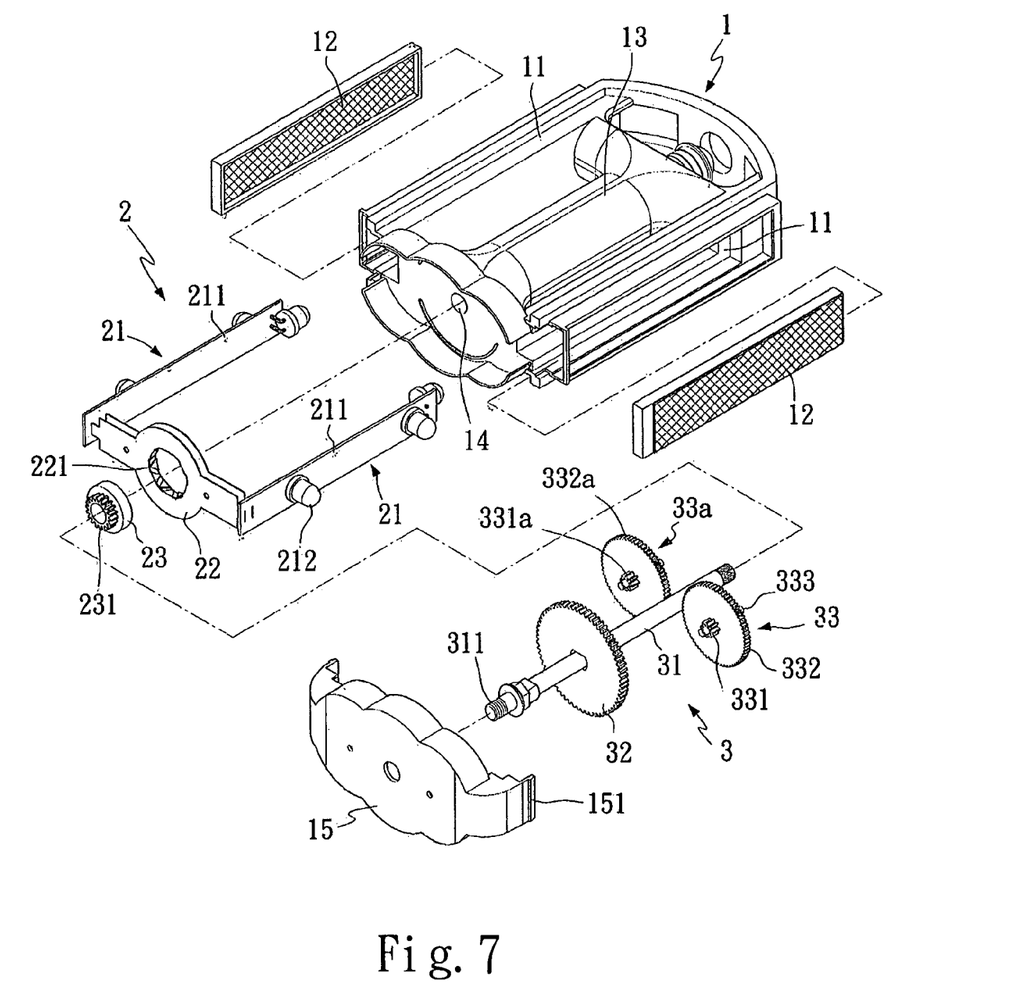
FIG. 7 is an exploded perspective view of another embodiment of the present invention.
Figure 8:
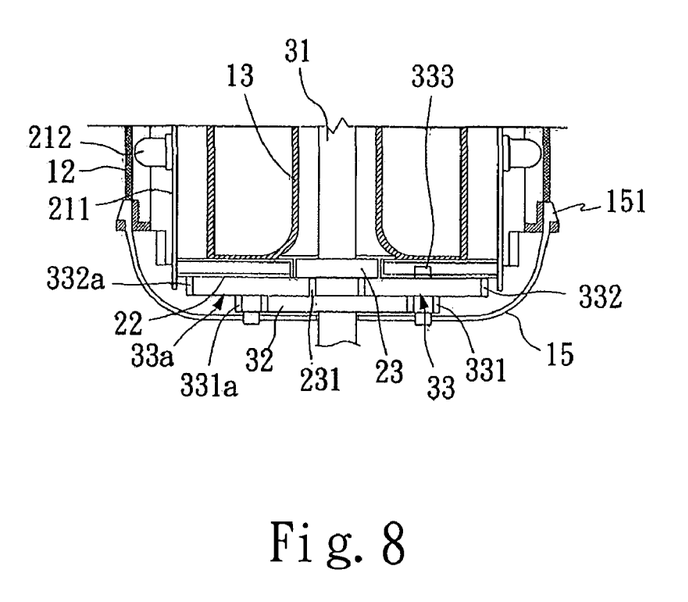
FIG. 8 is a sectional top view of another embodiment of the present invention.

Please refer to FIGS. 7 and 8 that show an exploded perspective view and a sectional top view of another embodiment of the present invention respectively. As shown in these figures, when in practice, in addition to the second gear 33 that is engaged with the first gear 32 and the dentate part 231 of the permanent magnet 23 mentioned in the previous embodiment, another second gear 33a is used and provided on one side of the second gear 33 in current embodiment. A first disc 331a and a second disc 332a of the second gear 33a are engaged with the first gear 32 and the dentate part 231 of the permanent magnet 23 respectively. Therefore, enough electric power also can be produced by rapid rotation of the permanent magnet 23 as a result of differential ratio of the first gear 32 and the second gear 33, 33a. The produced electric power can be provided to the luminous portion 21 for stable illumination.

Accordingly, as disclosed in the above description and attached drawings, the present invention can provide a luminous pedal for a bicycle that works by means of the differential ratio of the first and the second gears to produce enough electric power for stable illumination and conventional disadvantages can be overcome. It is novel, easy to be operated, and can be put into industrial use to meet the need of the market.

Although the embodiments of the present invention have been described in detail, many modifications and variations may be made by any person skilled in the art from the teachings disclosed hereinabove. Therefore, it should be understood that any modification and variation equivalent to the spirit of the present invention be regarded to fall into the scope defined by the appended claims.

What is claimed is:

1. A luminous pedal for a bicycle, comprising:
   a pedal provided with slots at two lateral sides respectively, a supporting portion in the middle, and an axial hole in communication with the supporting portion at one end thereof;
   a luminous unit having luminous portions disposed in the slots, a coil seat that is in electric connection with the luminous portions and disposed at an end of the pedal, and a permanent magnet that is detachably disposed in the coil seat and has a dentate part on a surface; and
   a rotary unit having an axial rod movably inserted into the axial hole, a first gear disposed at the axial rod, and a second gear that has a first disc and a second disc, where the first disc and the second disc are superimposed coaxially, the first disc is smaller than the second disc and the first gear, and the two discs are engaged with the first gear and the dentate of the permanent magnet, the first disc of the second gear being provided on one surface of the second disc and another surface of the second disc being provided with an axis that is movably connected with the coil seat of the luminous unit.

2. The luminous pedal for a bicycle as claimed in claim 1, wherein a cover is provided at one end of the pedal for enclosing the coil seat, the permanent magnet, the first gear, and the second gear, and one end of the axial rod protrudes out of the cover.

3. The luminous pedal for a bicycle as claimed in claim 2, wherein two lateral sides of the cover have hooks respectively for connection with the pedal.

4. The luminous pedal for a bicycle as claimed in claim 1, wherein one side of each slot is provided with a reflection plate.

5. The luminous pedal for a bicycle as claimed in claim 1, wherein the coil seat has coil in connection with the luminous portions.

6. The luminous pedal for a bicycle as claimed in claim 1, wherein the each luminous portion at least has a circuit board and a plurality of luminous bodies disposed on the circuit board.

7. The luminous pedal for a bicycle as claimed in claim 1, wherein the axial rod has a thread part at one end.

8. A luminous pedal for a bicycle, comprising:

a pedal provided with slots at two lateral sides respectively, a supporting portion in the middle, and an axial hole in communication with the supporting portion at one end thereof;

a luminous unit having luminous portions disposed in the slots, a coil seat that is in electric connection with the luminous portions and disposed at an end of the pedal, and a permanent magnet that is detachably disposed in the coil seat and has a dentate part on a surface; and a rotary unit having an axial rod movably inserted into the axial hole, a first gear disposed at the axial rod, and a second gear that has a first disc and a second disc, where the first disc and the second disc are superimposed coaxially, the first disc is smaller than the second disc and the first gear, and the two discs are engaged with the first gear and the dentate of the permanent magnet;

another second gear being provided on one side of the second gear and a first disc and a second disc of another second gear being engaged with the first gear and the dentate part of the permanent magnet respectively.

9. The luminous pedal for a bicycle as claimed in claim 8, wherein a cover is provided at one end of the pedal for enclosing the coil seat, the permanent magnet, the first gear, and the second gear, and one end of the axial rod protrudes out of the cover.

10. The luminous pedal for a bicycle as claimed in claim 9, wherein two lateral sides of the cover have hooks respectively for connection with the pedal.

11. The luminous pedal for a bicycle as claimed in claim 8, wherein one side of each slot is provided with a reflection plate.

12. The luminous pedal for a bicycle as claimed in claim 8, wherein the coil seat has coil in connection with the luminous portions.

13. The luminous pedal for a bicycle as claimed in claim 8, wherein the each luminous portion at least has a circuit board and a plurality of luminous bodies disposed on the circuit board.

14. The luminous pedal for a bicycle as claimed in claim 8, wherein the axial rod has a thread part at one end.

\* \* \* \* \*